(12) United States Patent
Kalandek

(10) Patent No.: US 8,007,003 B2
(45) Date of Patent: Aug. 30, 2011

(54) AIR BAG MODULE WITH T-DIFFUSER FOR INFLATOR

(75) Inventor: Bruce A. Kalandek, Dearborn, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 141 days.

(21) Appl. No.: 12/354,888

(22) Filed: Jan. 16, 2009

(65) Prior Publication Data

US 2010/0164208 A1 Jul. 1, 2010

Related U.S. Application Data

(60) Provisional application No. 61/142,052, filed on Dec. 31, 2008.

(51) Int. Cl.
*B60R 21/26* (2011.01)
(52) U.S. Cl. ......................................... 280/740; 280/742
(58) Field of Classification Search .................. 280/736, 280/740, 742
See application file for complete search history.

(56) References Cited

U.S. PATENT DOCUMENTS

| 5,954,359 | A | 9/1999 | Ross |
| 6,152,484 | A * | 11/2000 | Fischer et al. ................ 280/736 |
| 6,293,581 | B1 | 9/2001 | Saita et al. |
| 6,601,871 | B2 | 8/2003 | Fischer |
| 6,802,532 | B2 | 10/2004 | Heigl et al. |
| 6,811,184 | B2 | 11/2004 | Ikeda et al. |
| 7,021,652 | B2 | 4/2006 | Kumagai et al. |
| 7,086,663 | B2 * | 8/2006 | Honda ...................... 280/730.2 |
| 7,174,919 | B2 * | 2/2007 | Kenyon et al. .................. 138/37 |
| 7,278,656 | B1 | 10/2007 | Kalandek |
| 7,370,882 | B2 * | 5/2008 | Tokunaga et al. .......... 280/730.2 |
| 7,380,819 | B2 | 6/2008 | Fricke et al. |
| 7,384,062 | B2 | 6/2008 | Yokoyama et al. |
| 7,422,234 | B2 | 9/2008 | Huber et al. |
| 7,422,235 | B2 | 9/2008 | Wollin et al. |
| 2003/0141710 | A1 | 7/2003 | Zahn et al. |
| 2003/0160433 | A1 | 8/2003 | Kumagai et al. |
| 2005/0184491 | A1 * | 8/2005 | Itoga .......................... 280/730.1 |

FOREIGN PATENT DOCUMENTS

| JP | 2003-034221 A | 2/2003 |
| JP | 2003-063348 A | 3/2003 |

* cited by examiner

*Primary Examiner* — Paul N Dickson
*Assistant Examiner* — Timothy D Wihelm
(74) *Attorney, Agent, or Firm* — Markell Seitzman

(57) ABSTRACT

A diffuser (50) for use in an air bag system, the diffuser comprising: a connector part (52) configured to be connected to an air bag inflator, the connector part including a side wall (53); and a gas distribution part formed as an integral extension of the connector part and configured to deliver gas from the connector part to the air bag (150), and the distribution part including a first conduit (60) and a second conduit (70), the two conduits configured to give the diffuser a low profile.

16 Claims, 4 Drawing Sheets

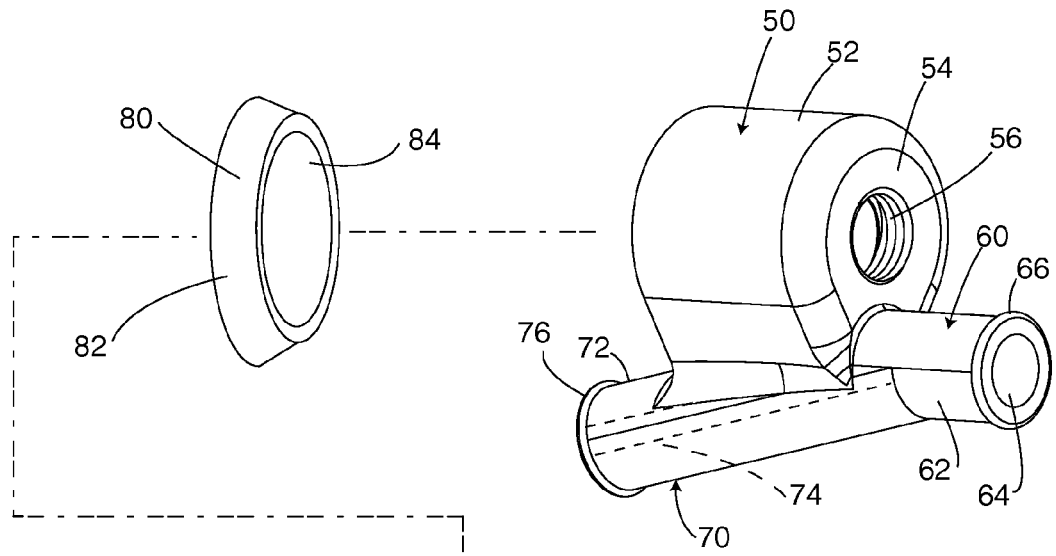
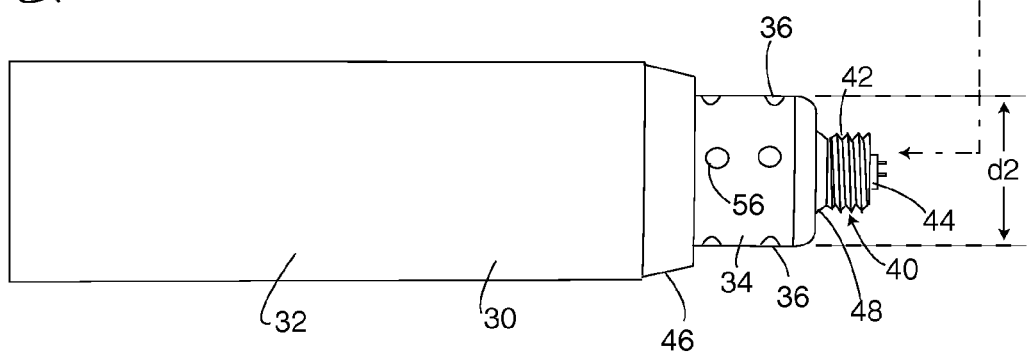
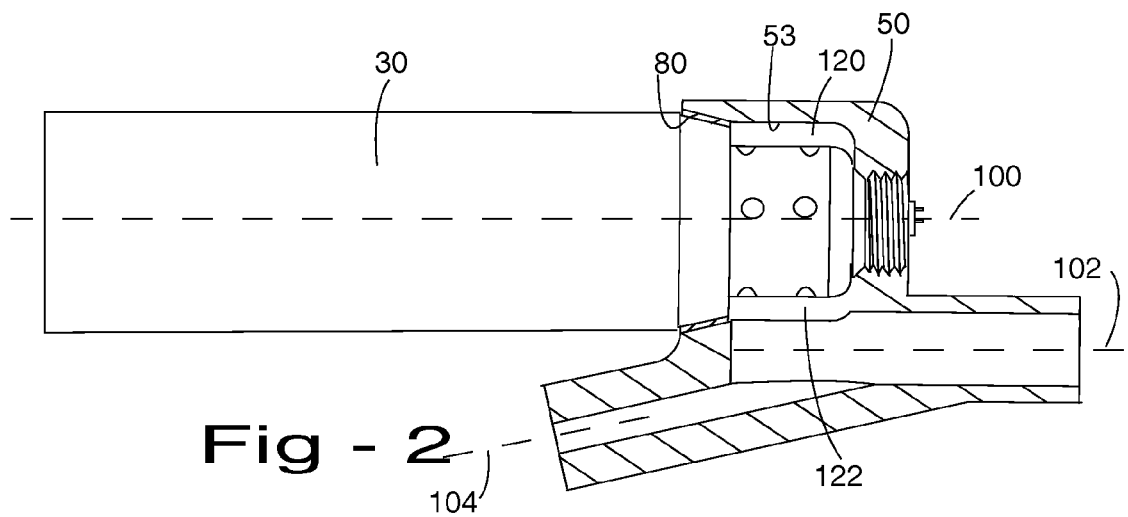

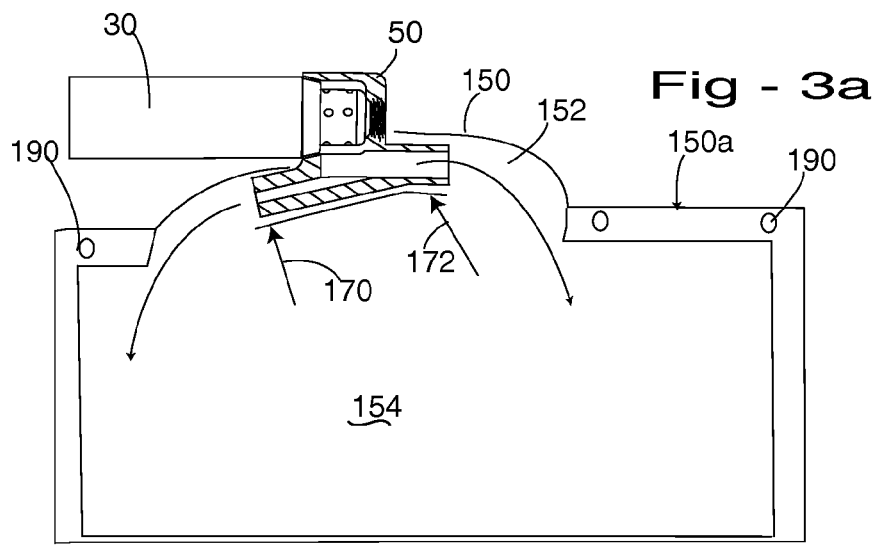
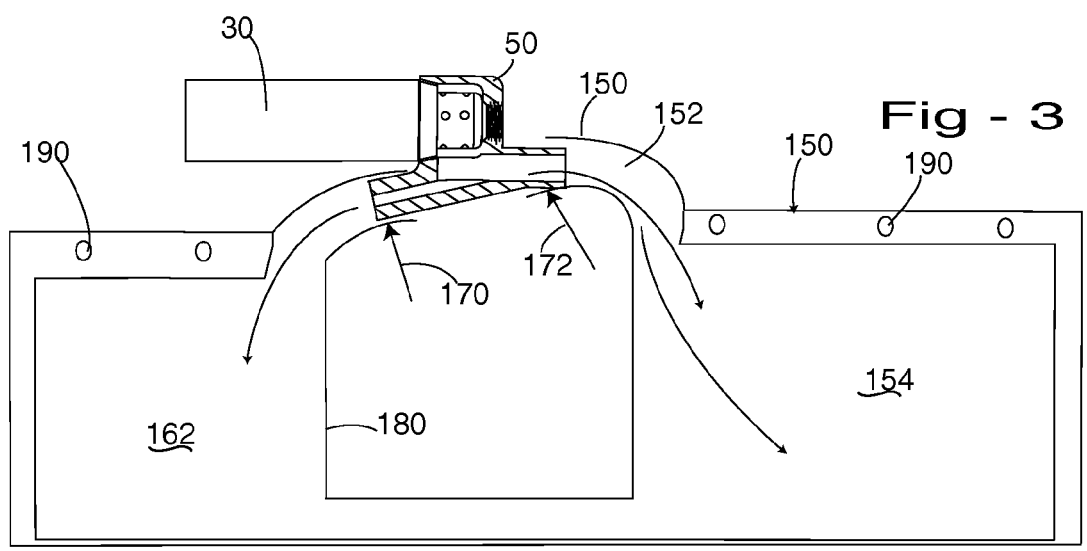
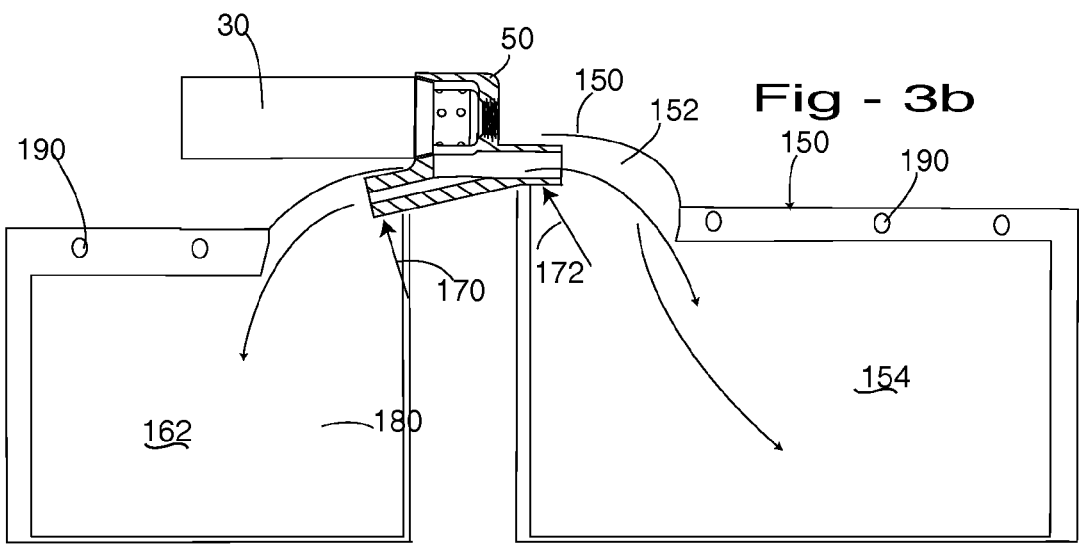

AIR BAG MODULE WITH T-DIFFUSER FOR INFLATOR

This application claims the benefit of U.S. Provisional Application 61/142,052, filed on Dec. 31, 2008. The disclosure of the above application is incorporated herein by reference.

BACKGROUND AND SUMMARY OF THE INVENTION

The present invention relates to air bags, inflators for air bags and diffusers that distribute inflation gas to one or more parts of an air bag.

An inflator by itself or the combination of an inflator and a diffuser is used to provide inflation gas to an air bag. The air bag may include one or more separate or connected chambers. In order to distribute inflation gas directly to these various chambers, the diffuser having a single input and multiple outlets has been used. Such diffusers have been used in seat-mounted, side impact air bag systems, as well as curtain air bag systems. Prior diffusers have been made of cast or machined metal and are often relatively expensive components. The prior art also shows the use of diffusers having a general Y-shape. Those portions of the diffuser forming the outlet passages or outlet ports extend significantly beyond a longitudinal axis of the inflator and create difficulties in packaging curtain module systems within the roof rail of certain vehicles.

It is an object of the present invention to solve the difficulties of the prior art. Another object of the present invention is to provide a plastic Y-shaped diffuser having a narrow profile. A further object of the present invention is to provide a Y-shaped diffuser configured to be molded by a tool where the outlet passages can be formed utilizing linear slides within the molding tool, thereby making it easier to manufacture a part of lower cost, as well as yielding a manufacturing (molding) tool of lower cost.

More specifically the invention comprises: a diffuser for use in an air bag system, the diffuser comprising: a body configured to be connected about an exit port of an air bag inflator to receive gas from the inflator, the body including an outer wall; and a first gas distribution outlet formed as an integral extension of the body and configured to deliver gas from the connector part to a first portion of the air bag; the first gas distribution outlet including a first side wall with a first passage therethrough, the first side wall being contiguous with the outer wall of the body, the first side wall at one end thereof intersecting the body, the first passage having an effective first area; the first side wall, at an end opposite the end that intersects the body, terminates at a distal end configured to be connected to the air bag, the intersection of the first side wall with the outer wall of the body, a first opening communicating the connector part and the first passage; the body including a second gas distribution outlet including a second side wall with a second passage therethrough, a distal end connectable to the air bag; the second side wall intersecting the first side wall at a location generally opposite the location where the first side wall intersected the outer side of the body forming a second opening communicating the first passage with the second passage.

BRIEF DESCRIPTION OF THE DRAWINGS

FIG. 1 is an exploded view of the major components of the present invention including a diffuser configured to mount to an air bag inflator.

FIG. 2 shows the diffuser mounted to the inflator.

FIG. 3 illustrates the diffuser and inflator operatively connected to a multi-chambered curtain air bag.

FIG. 3a shows an alternate embodiment of the invention.

FIG. 3b shows another embodiment of the invention.

DETAILED DESCRIPTION OF THE DRAWINGS

Figure 4:
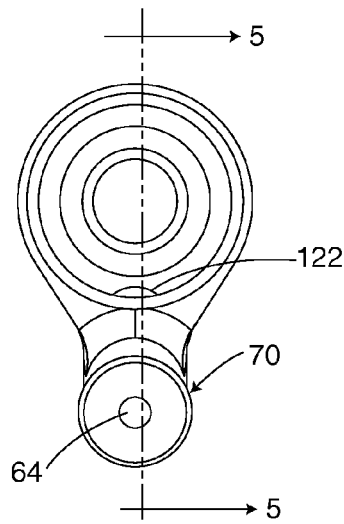
FIG. 4 is an end plan view of a diffuser.

FIG. 1 illustrates the major features of an air bag system 20, which includes an inflator 30 and diffuser 50. The inflator 50 can be of any type including hybrid or cold gas inflator but can also be a solid fuel inflator. The inflator has a narrow body 32 and an exit end 34. The exit end 34 includes a plurality of exit ports 36 that are often arranged in a thrust-neutral manner. The inflator proximate the exit end includes a hollow stub or projection 40, with threads 42. Electrical connectors 44 of an igniter subassembly extend out of the threaded projection 40. As is known in the art, the inflator includes within its body stored gas or solid propellant.

Diffuser 50 includes a main body 52 having an end wall 54; end wall 54 includes a threaded bore 56. The inflator includes a first outlet 60 formed of a cylindrical wall 62 having a passage 64 that intersects the interior of body 52. The end of wall 62 is formed into a lip 66 to assist in connecting the diffuser to the air bag. Diffuser 50 additionally includes a second outlet 70 formed into a cylindrical wall 72 having a passage 74 therethrough. The end of wall 72 is formed into another lip 76. The diffuser 50 may additionally include a seal 80 in the form of an annular, truncated cone separate from the body or the body can provide the sealing function.

Reference is now also made to FIGS. 2 through 6. In FIG. 2, the diffuser 50, shown in cross-section, has been mounted to inflator 30. Inflator 30 additionally includes a first tapered surface 46 and second tapered surface 48. As can also be seen from FIGS. 2 and 5, the body 52 of diffuser 50 is hollow and includes a central bore 90 having a diameter d1 larger than a diameter d2 of the exit end of the inflator. Body 52 additionally includes a first tapered surface 92 and second tapered surface 94. FIG. 2 additionally shows the use of an independent seal 80, which has been placed upon surface 46 of the inflator. Subsequently, diffuser 50 is mounted to inflator 30 by screwing the diffuser 50 to the threaded projection 40. As can be seen, with a diffuser 50 in place upon the inflator, tapered surface 92 presses against surface 82 of the seal. Interior surface 84 of the seal presses upon surface 94. The seal provides a fluid tight connection between the diffuser and the inflator. As can be appreciated, if a separate seal such as 80 is not used, the tapered conical surface 92 will generate a fluid tight seal with surface 46; of course one or both surfaces must be repositioned from the relative positions shown to effect the sealing function. Additionally, surface 48 of the inflator provides a fluid tight seal with surface 94 of the diffuser.

Figure 5:
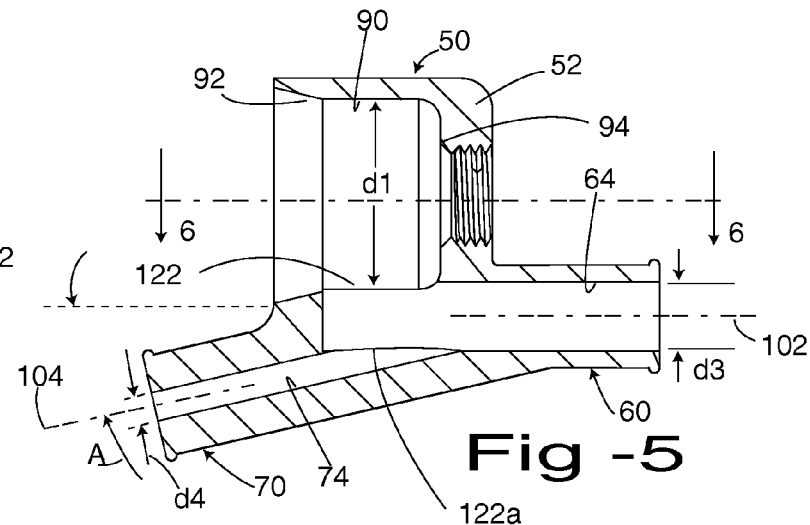
FIG. 5 is a cross-sectional view through section 5-5 of FIG. 4.
Figure 5A:
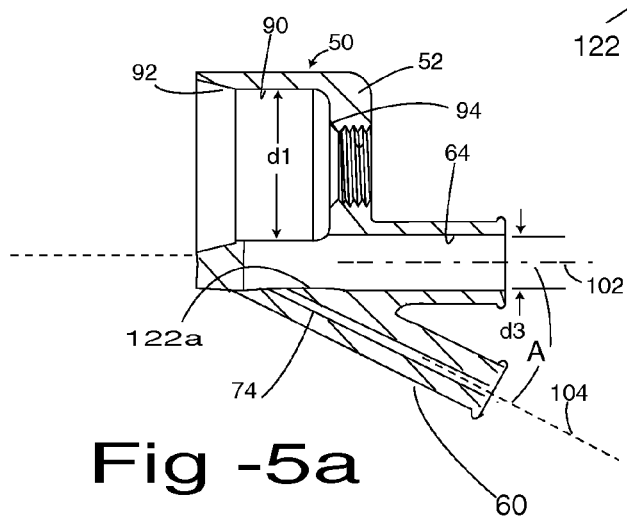
FIG. 5a shows another embodiment of the invention.

Numeral 100 is used to designate both a central axis of the body axis and a central axis of the inflator. Numeral 102 designates a central axis of the first outlet port 60 while numeral 104 designates a central axis of outlet 70. In order to maintain a low profile shape of diffuser 50, the axis of outlet 60 is maintained parallel to and closely spaced relative to the axis of the inflator 50. Additionally, outlet port 70 extends oppositely from outlet port 60, as shown in FIG. 5, or in generally the same direction as shown in FIG. 5*a*. Axis 104 is maintained at an angle A, see FIG. 5, which is in the range of 10 to about 160 degrees.

Figure 6:
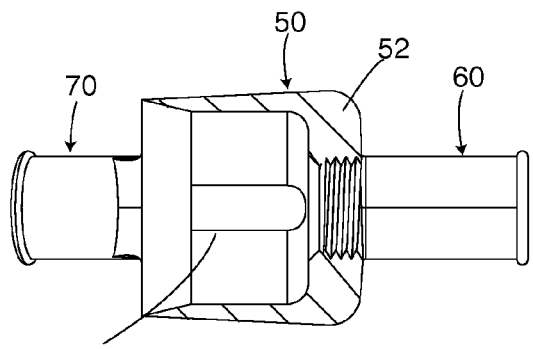
FIG. 6 is a cross-sectional view through section 6-6 of FIG. 5.

As can be seen in FIG. 2, the inner wall 53 of body 52, in cooperation with the exterior of the exit end 34, creates an angular gas receiving chamber 120. As can also be seen in FIG. 2 and FIG. 5 the diameter, d3, (or area) of passage 62 is greater than a diameter d4, (or area) of passage 72. Additionally, the preferred spacing between axes 100 and 102 is sufficiently close that the circular cylindrical surface defining the interior walls of body 52 intersects passage 62 in the region designated by numeral 122. Passage 62 also intersects the lower portion of the rear wall, as can be seen in FIG. 4. The shape of this intersecting region 122 is substantially rectangular, as illustrated in FIG. 6, which is another cross-sectional view. In the preferred embodiment of the invention, the area of region 122 is equal to or greater than the cross-sectional area of passage 62 plus passage 72. Also, to assist in maintaining the low profile of diffuser 50 and to promote proper gas flow, passage 72 intersects the passage 62 at a location generally opposite the location of region 122; this opposite location is noted by numeral 122*a*.

Reference is made to FIGS. 3, 3*a* and 3*b*. FIG. 3 shows the inflator 30 and diffuser 50 connected to a multi-chambered curtain air bag 150, FIG. 3*a* shows the inflator and diffuser connected to a single chambered air bag, while FIG. 3*b* shows the inflator and diffuser connected to two air bags. Returning to FIG. 3, air bag 150 includes a first inlet 152 in communication with the first or forward inflatable chamber 154. When the air bag is mounted to the vehicle, chamber 154 will be located between the A-pillar and B-pillar of the vehicle. Air bag 150 additionally includes a second inlet 160 in communication with another chamber 162 located to the rear of the chamber 154. Arrows 170 and 172 show the location of clamps, which will clamp the respective inlets 152 and 160 to the outlets 60 and 70 of the diffuser. Air bag 150 additionally includes a non-inflatable region 180. Air bag 150 shows in a top, border region a plurality of openings 190 that are used to mount the air bag to a roof rail, headliner or appropriate portion of the vehicle. Further, in the context of FIG. 3, the low-profile nature of the diffuser can be better appreciated. Also, the diffuser does not have to be connected directly to the air bag but can be connected to the air bag via tubes and the like.

Reference is again made to FIG. 3*a*, which shows the diffuser within an air bag 150*a* having a single chamber 158. In this embodiment the diffuser simultaneously directs gas to flow in two directions within the single chambered bag. In FIG. 3*b*, the one outlet of the diffuser is connected to air bag 150*c*, while the other outlet of the diffuser is connected to air bag 150*d*. For example, air bag 150*c* can be sized to extend from the A-pillar to the C-pillar of a vehicle, while air bag 150*d* can be sized to fit between the C and D pillars of the vehicle. Each of these air bags can have one or more inflatable chambers such as 154 and 162.

Figure 7:
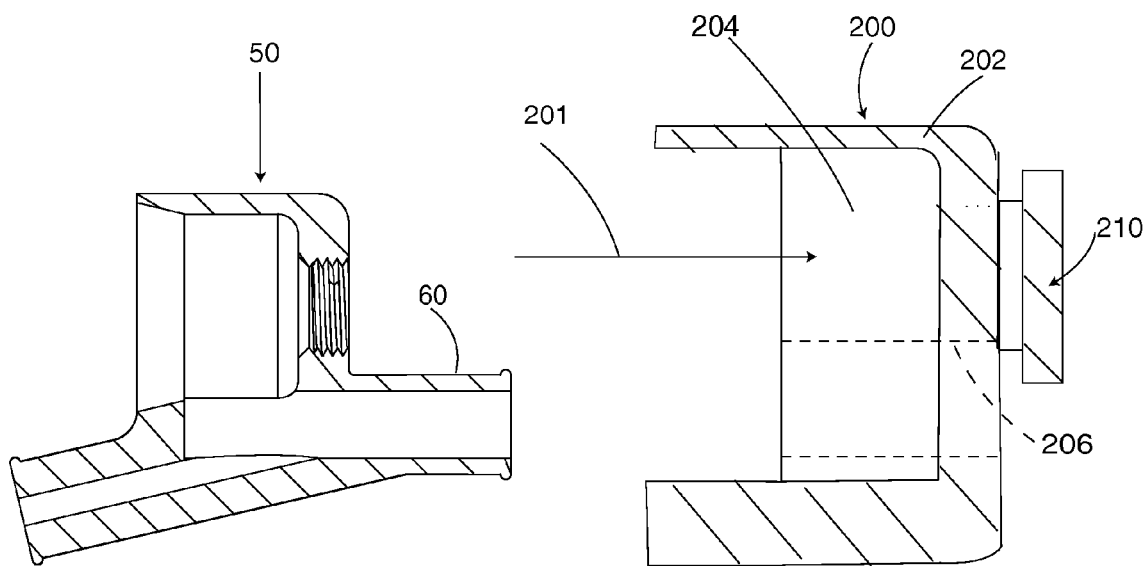
FIGS. 7 and 8 illustrate the use of a tool for tightening the diffuser about the inflator.
Figure 8:
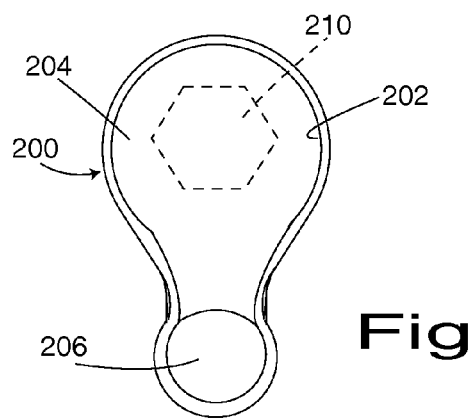

As previously mentioned, the preferred material or class of materials used to manufacture a diffuser 50 is plastic. The diffuser can use glass reinforced nylon, nylon 6-6, aluminum or steel, each of which is amenable to molding. Using these materials the diffuser can be machined, but this is not preferred as it is often more costly than molding. In order for the diffuser to work effectively it must create a fluid tight seal with the inflator. At a minimum, if the diffuser does not include the threaded bore 56, the diffuser could be welded to the inflator. In this case the threads on the projection 40 of the inflator and the threads in the bore 56 would be removed. The projection would be welded to the end wall 54. The illustrated diffuser needs to be tightly screwed onto the inflator to create the seal. During assembly, the diffuser would be rotated by a tool into a tight-fitting relation with the inflator; hand tightening would probably not suffice. Care must be taken not to damage the diffuser during this tightening process. FIGS. 7 and 8 represent one such tool that has been successfully used in combination with the present diffuser to tighten the diffuser onto the inflator. This tool is especially useful with the diffuser made from plastic. FIG. 7 shows a cross-sectional view of diffuser 50 as well as a cross-sectional view of a tightening tool 200. Arrow 201 is provided for the purpose of illustration to show the relative movement between the tool and diffuser as the diffuser is received in the tool. Also shown in FIG. 8 is a tightening tool 200, which includes a cup-shaped body 202 having a cross-sectional shape substantially identical to the cross-section taken through the diffuser 50, such as shown in FIG. 5. FIG. 8 illustrates the shape of the interior of body 202. The tightening tool 200 additionally includes an integrally formed nut 210, which may be hexagonally shaped or of some other shape so the tool and diffuser can be tightened manually or with a wrench. The interior shape of body 202 provides a sufficiently large contact area with the diffuser 50, to lessen creating large forces that might tend to crack or otherwise deform the diffuser 50; this would be especially important if it is made from a plastic that is not particularly strong.

The body 202 includes a thickened top 204 with an open bore 206 therethrough. The tightening tool is slid over the diffuser, with tube 60 entering through opening 204, and with end surface 54 abutting the thickened portion 204. If the diffuser is already partially threaded upon the inflator, the tightening tool is rotated until the diffuser 50 mates with the inflator to create a fluid tight seal. If the diffuser is not yet on the inflator, the diffuser can be inserted first into the tightening tool and then the diffuser, still in the tightening tool, is placed on the inflator, and thereafter the tightening tool is rotated to seat the diffuser upon the inflator.

Many changes and modifications in the above-described embodiment of the invention can, of course, be carried out without departing from the scope thereof. Accordingly, that scope is intended to be limited only by the scope of the appended claims.

The invention claimed is:

1. A diffuser for use in an air bag system, the diffuser comprising:

a connector part configured to be connected about an exit port of an air bag inflator;

a gas distribution part formed as an integral extension of the connector part and configured to deliver gas from the connector part to an inflatable volume of the air bag;

the gas distribution part including a first conduit having a side wall, the first conduit being closed at one end and having a first passage of a first diameter within the first conduit side wall, the first passage terminates at a distal end forming a first distribution port configured to be connected to a first inflatable volume, the first passage intersects the side wall of the connector part forming a first flow chamber between the connector part and first conduit;

the gas distribution part also including a second conduit having a side wall with a second passage therethrough and a distal end forming a second distribution port, the second passage intersecting the first conduit generally opposite the location where the first conduit intersected the side of the connector part, forming an extension of the first flow chamber, gas received in the first flow chamber exiting the diffuser through the first and second passages.

2. The diffuser according to claim 1 wherein the diameter of the first passage is larger than the diameter of the second passage.

3. The diffuser according to claim 1 wherein the second passage has an effective area less than or equal to the area of the first passage.

4. The diffuser according to claim 1 wherein the body includes a threaded bore (56) to enable the threaded connection to the inflator.

5. The diffuser according to claim 1 wherein an axis through the center of the first conduit and an axis through the center of the connector part are parallel to one another.

6. The diffuser according to claim 1 wherein the second conduit is oriented approximately opposite to the first conduit.

7. The diffuser according to claim 6 wherein an axis through a center of the second conduit is arranged at an angle to an axis through the center of the first conduit.

8. The diffuser according to claim 6 wherein the angle is in a range of about 16 to 160 degrees.

9. A diffuser for use in an air bag system, the diffuser comprising:
a body (52) having an outer wall (53) and a receiving chamber (120), the body configured to receive an exit port of an air bag inflator with the receiving chamber, the outer wall forming a portion of the receiving chamber; and
a first gas distribution outlet formed along a radial extreme of the receiving chamber and configured to deliver gas from the receiving chamber to a first portion of the air bag;
the first gas distribution outlet (60) including a first side wall (62) with a first passage (64) therethrough, the first side wall being contiguous with and intersecting the outer wall (53) of the body (52), the first passage having an effective first area; the first side wall, at an end opposite the end that intersects the body, terminates at a distal end (66) configured to be connected to the air bag, the intersection of the first side wall with the outer wall of the body, a first opening communicating the connector part and the first passage;
the body including a second gas distribution outlet (70) including a second side wall (72) with a second passage (74) therethrough, a distal end connectable to the air bag;
the second side wall (70) intersecting the first side wall (60) at a location generally opposite the location where the first side wall intersected the outer side of the body forming a second opening communicating the first passage with the second passage;
wherein the first gas distribution outlet intersects the body proximate an edge of the body;
wherein an axis through the center of the first gas distribution outlet and an axis through the center of the body are parallel to one another.

10. The diffuser according to claim 9 wherein the first opening (122) is generally rectangular in plan view.

11. The diffuser according to claim 9 wherein the second gas distribution outlet is oriented approximately opposite to the first gas distribution outlet.

12. The diffuser according to claim 11 wherein an axis through a center of the second passage is arranged at an angle to an axis through the center of the first passage.

13. The diffuser according to claim 11 wherein the angle is in a range of about 16 to 160 degrees.

14. The diffuser according to claim 9 wherein the first opening (122) is generally rectangularly shaped in plan view.

15. The diffuser according to claim 9 including a seal between the body and the inflator.

16. The diffuser according to claim 9 wherein the first and second gas distribution outlets are each connectable to different inflatable portions of a single-chambered or multi-chambered air bag or to a plurality of air bags.

* * * * *